(12) United States Patent
Chen

(10) Patent No.: US 6,741,405 B1
(45) Date of Patent: May 25, 2004

(54) HOOD FOR A DIGITAL IMAGE COLLECTING LENS

(75) Inventor: Wen Ching Chen, Taichung (TW)

(73) Assignee: Exquisite Optical Technology Co., LTD, Taichung (TW)

( * ) Notice: Subject to any disclaimer, the term of this patent is extended or adjusted under 35 U.S.C. 154(b) by 0 days.

(21) Appl. No.: 10/397,073

(22) Filed: Mar. 27, 2003

(51) Int. Cl.[7] .................................................. G02B 7/02
(52) U.S. Cl. ..................... 359/813; 359/811; 359/819; 359/822; 359/823
(58) Field of Search ................................ 359/811, 822, 359/823, 819, 813, 583, 820; 396/534, 535

(56) References Cited

U.S. PATENT DOCUMENTS

| | | | | |
|---|---|---|---|---|
| 4,090,780 A | * | 5/1978 | Davis ........................... | 359/826 |
| 4,422,169 A | * | 12/1983 | Vitale et al. .............. | 369/44.22 |
| 5,592,335 A | * | 1/1997 | Omi et al. ................... | 359/695 |
| 5,979,760 A | * | 11/1999 | Freyman et al. ............. | 235/454 |
| 6,459,857 B2 | * | 10/2002 | Kawamura et al. ......... | 396/374 |
| 6,573,939 B1 | * | 6/2003 | Yokoyama ................... | 348/375 |
| 2001/0019662 A1 | * | 9/2001 | Shono ......................... | 396/287 |
| 2002/0067406 A1 | * | 6/2002 | Chen ............................ | 348/61 |

\* cited by examiner

*Primary Examiner*—Ricky Mack
*Assistant Examiner*—Brandi N Thomas

(57) ABSTRACT

A hood for a digital image-collecting lens includes a base member having a recess defined in a bottom of the base member and to receive an image sensor that has a coupling crystal contained in the image sensor. A through hole is defined in the base member and communicating with the recess and longitudinally and straightly aligns with the coupling crystal. A lens seat is longitudinally and secured in the through hole in the base member and includes a through hole longitudinally and centrally defined in the lens seat. The through hole in the lens seat receives a camera lens of the digital image-collecting lens. At least one annular slot is longitudinally defined between an inner periphery of the through hole in the lens seat and an outer periphery of the lens seat, and longitudinally extending to corresponds to the camera lens.

6 Claims, 6 Drawing Sheets

HOOD FOR A DIGITAL IMAGE COLLECTING LENS

BACKGROUND OF THE INVENTION

1. Field of the Invention

The present invention relates to a hood, and more particularly to a hood for a digital image-collecting lens.

2. Description of Related Art

A conventional hood for a digital image-collecting lens in accordance with the prior art shown in FIG. 7 comprises base member (50) adapted to cover an image sensor (70) and a lens seat (60) longitudinally mounted to the base member (50).

The base member (50) includes a recess (51) defined in a bottom of the base member (50) for receiving the image sensor (70). A protrusion (52) extending from a top surface of the base member (50) and a threaded hole (53) is longitudinally defined in the protrusion (52). The threaded hole (53) extending through the protrusion (52) and communicates with the recess (51). The threaded hole (53) straightly corresponds to a center of the image sensor (70). The base member (50) includes two opposite sides each having an ear (54) laterally extending from the base member (50). A through hole (541) is longitudinally defined in each of the ear (54) such that the base member (50) can be easily secured on a printed circuit board by bolts (not shown) extending through the through hole (541) and screwed into the PCB.

The lens seat (60) is cylindrical and has a threaded section (61) formed near a lower section. The threaded section (61) is screwed into the threaded hole (53) to securely mount the lens seat (60) on the base member (50). The lens seat (60) has a hole (62) centrally and longitudinally defined therein for receiving a camera lens (80) of the digital image-collecting lens.

With reference to FIG. 8, as usual the camera lens (80) projects a developing zone (800) including a preferred area (801) centrally situated in the developing zone (800) and an aberration area (802) surrounding the preferred area (801). For a good image effect, a coupling crystal (71) of the image sensor (70) must be situated within the preferred area (801). However, the lens seat (60) is cylindrical because the hole (62) is longitudinally defined in the lens seat (60). With reference to FIGS. 9 and 10, the camera lens (80) may be extruded and slanting due to the following causes:

1. The thread of the lens seat (60) or threaded hole (53) in the base member (50) becomes deformed.
2. The threads of the lens seat (60) and threaded hole (53) in the base member are spiraled too tight.
3. The threaded section (61) becomes deformed.

As described above, an axis of the camera lens (80) is inclined relative to that of the coupling crystal (71) such that the coupling crystal (71) may be partially located in the aberration area (802). Consequently, the contours of the object in the image may be partially blurred. Furthermore, the image may be fully blurred when the axis of the camera lens (80) is seriously inclined relative to that of the coupling crystal (71) and the focus of the camera lens (80) does not focus on the coupling crystal (71).

With reference to FIG. 11 that shows another connecting type of the base member (50) and the lens seat (60). As shown in FIG. 11, the lens seat (60) is tightly inserted into the base member (50). As well known, the base member (50) and the lens seat (60) are manufactured of plastic by injecting molding for reducing the manufacturing cost such that the preciseness of the base member (50) or the lens seat (60) is difficult to accurately be controlled. Consequently, the lens seat (60) is easily and inward radially compressed after being inserted into the base member (50) such that the camera lens (80) easily causes the above problems. Furthermore, the base member (50) and the lens seat (60) expand when the temperature of the environment becomes high. This appearance may cause an inward radially force that equally acts on an outer periphery of the lens seat (60). Consequently, the curvature of the camera lens (80) may be changed and the collected image becomes blurred.

The present invention has arisen to mitigate and/or obviate the disadvantages of the conventional hood for a digital image-collecting lens.

SUMMARY OF THE INVENTION

The main objective of the present invention is to provide an improved hood for a digital image-collecting lens.

To achieve the objective, the hood in accordance with the present invention comprises a hood for a digital image-collecting lens including a base member that has a recess defined in a bottom of the base member to receive an image sensor that has a coupling crystal contained in the image sensor. A through hole is defined in the base member and communicating with the recess and longitudinally and straightly aligns with the coupling crystal. A lens seat is longitudinally and secured in the through hole in the base member and includes a through hole longitudinally and centrally defined in the lens seat. The through hole in the lens seat receives a camera lens of the digital image-collecting lens. At least one annular slot is longitudinally defined between an inner periphery of the through hole in the lens seat and an outer periphery of the lens seat, and longitudinally extending to corresponds to the camera lens.

Further benefits and advantages of the present invention will become apparent after a careful reading of the detailed description with appropriate reference to the accompanying drawings.

DETAILED DESCRIPTION OF THE INVENTION

Figure 1:
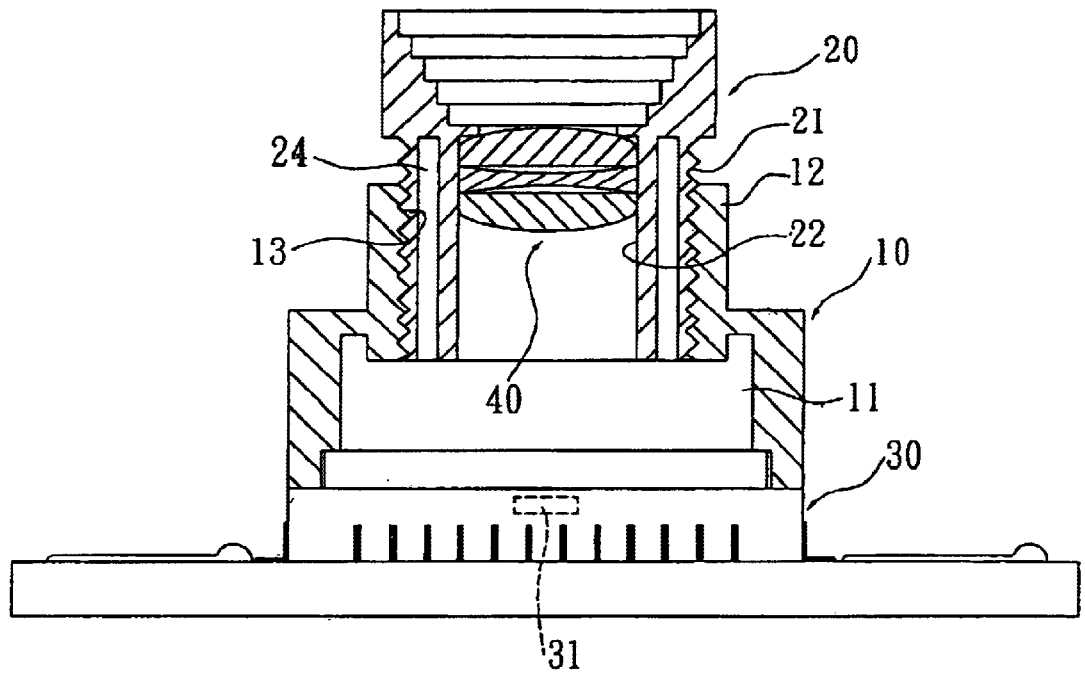
FIG. 1 is a side schematic view in cross-section of a hood for a digital image-collecting lens in accordance with the present invention.
Figure 2:
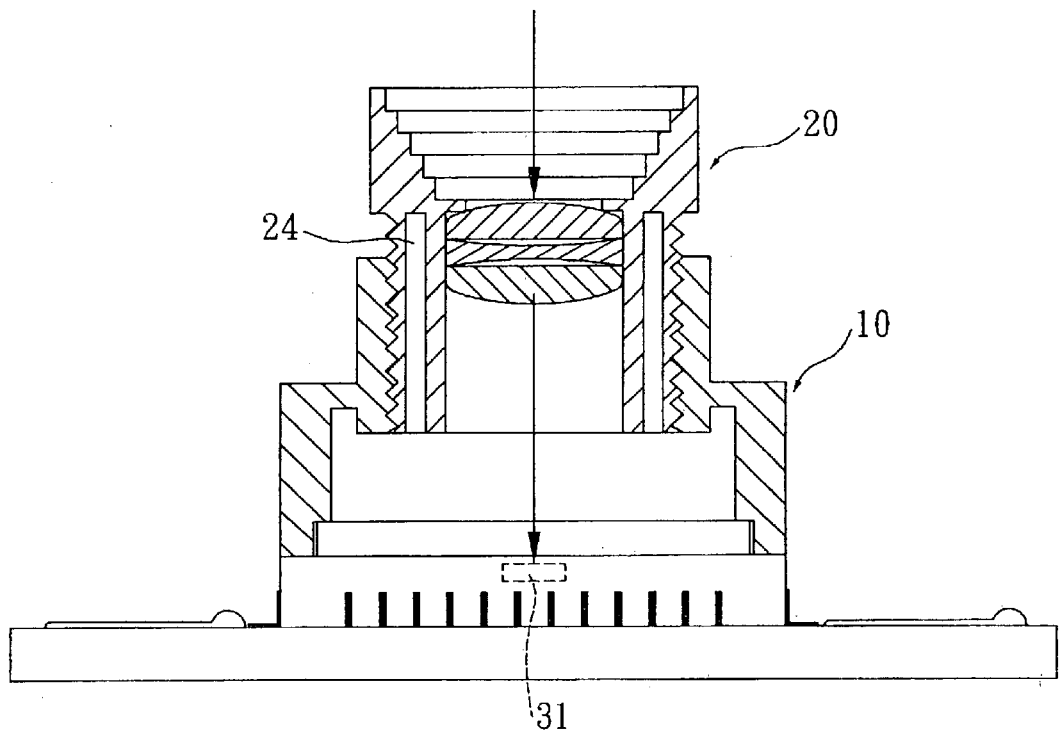
FIG. 2 is a side schematic view in cross-section of the hood in FIG. 1 for showing a light axis project into the lens.
Figure 3:
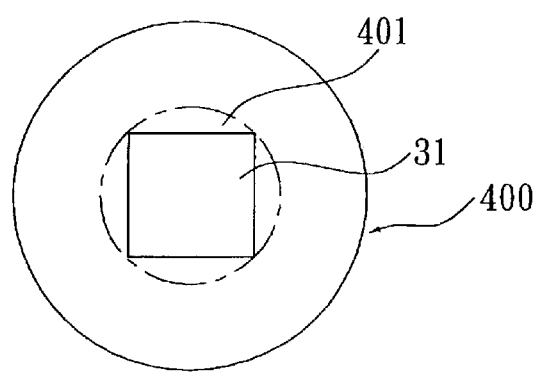
FIG. 3 is a top plan view of a developing zone of the lens that consists the hood of the present invention.

Referring to the drawings and initially to FIGS. 1–3, a hood for a digital image-collecting lens in accordance with the present invention comprises a base member (10) adapted to be mounted on an image sensor (30) of a CCD/CMOS, and a lens seat (20) longitudinally mounted to the base member (10).

The base member (10) includes a recess (11) for receiving the image sensor (30) and a protrusion (12) is centrally extending from a top surface of the base member (10). A threaded hole (13) is longitudinally defined in the protrusion (12) and extending through the base member (10). The threaded hole (12) communicates with the recess (11) and longitudinally straightly aligns with a coupling crystal (31) of the image sensor (30).

The lens seat (20) is cylindrical a threaded section (21) screwed into the threaded hole (13) in the base member (10) to hole the lens seat (20) in place. A through hole (22) is centrally and longitudinally defined in the lens seat (20) and adapted to receive a camera lens (40). An annular slot (24) is defined in the lens seat (20) between an inner periphery of the through hole (22) and an outer periphery of the lens seat (20). The annular slot (24) extends to communicate with the recess (11) in the base member (10) when the lens seat (20) is mounted to the base member (10). The annular slot (24) has a depth corresponding to a position where the camera lens (40) mounted.

Figure 4:
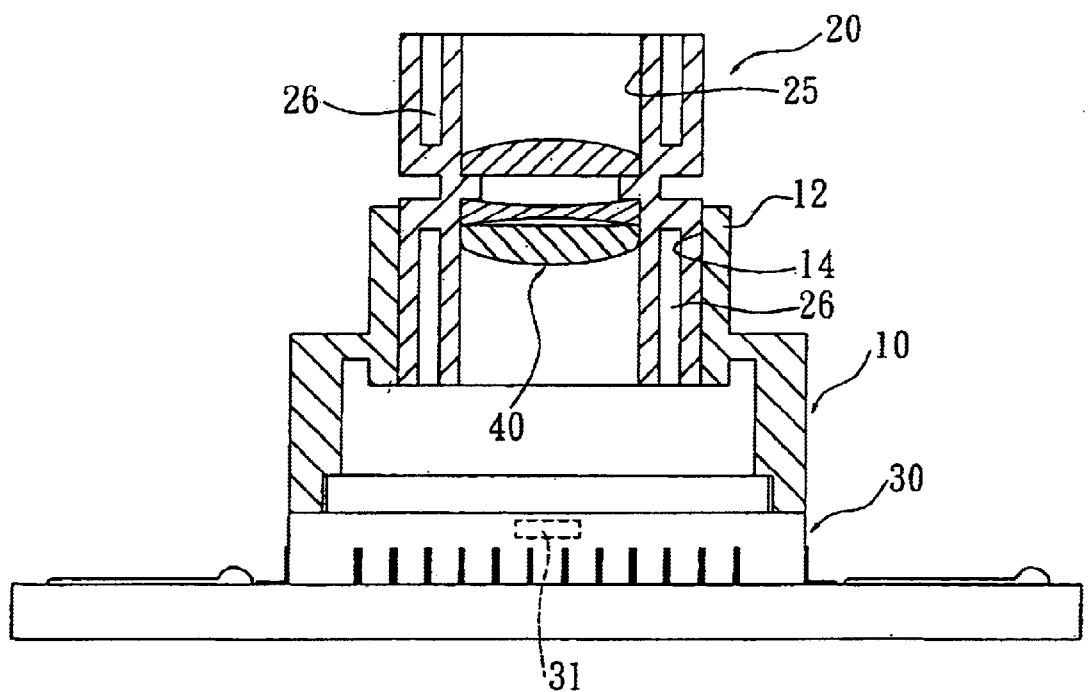
FIG. 4 is a side schematic view in cross-section of a second embodiment of the hood for a digital image-collecting lens in accordance with the present invention.
Figure 5:
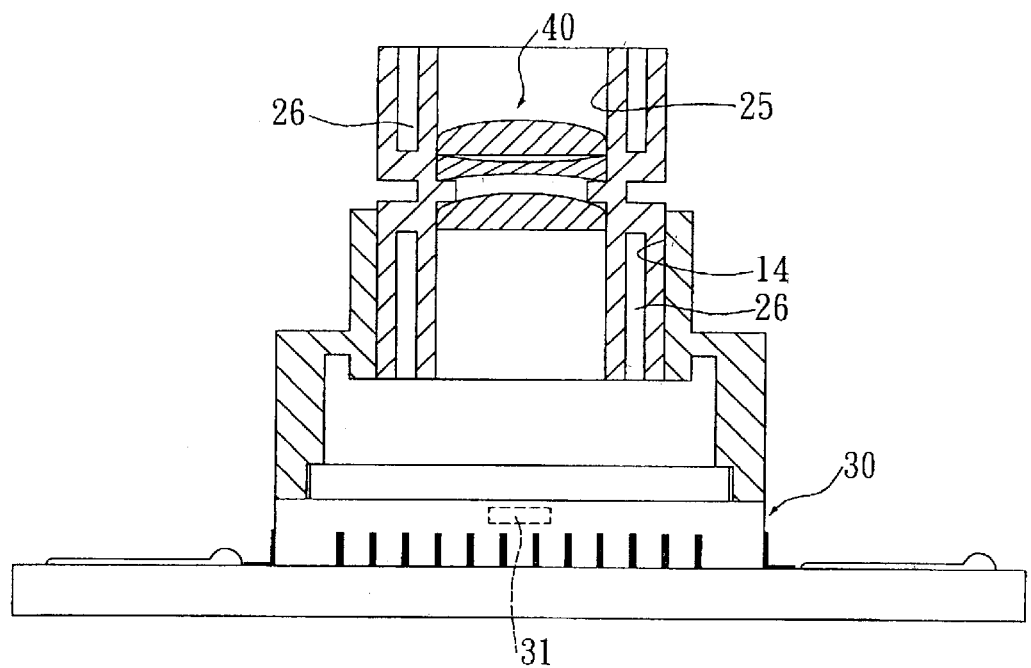
FIG. 5 is a side schematic view in cross-section of a second embodiment of the camera lens.

With reference to FIGS. 4 and 5 that show a second embodiment of the hood for a digital image-collecting lens in accordance with the present invention. The base member (10) has a through hole centrally and longitudinally defined in the protrusion (12), and the lens seat (20) is partially and tightly inserted into the through hole (14) in the base member (10). The through hole (14) in the base member (10) straightly and longitudinally aligns with the coupling crystal (31). The lens seat (20) has a through hole (25) centrally and longitudinally defined therein for receiving the camera lens (40). The lens seat (20) includes two opposite ends each having an annular slot (26) defined in the lens seat (20) between an inner periphery of the through hole (25) in the lens seat (20) and an outer periphery of the lens seat (20). The two annular slots (26) extend toward each other and corresponding to each other. Each annular slot (26) extending to a position where the camera lens (40) is mounted.

Figure 6:
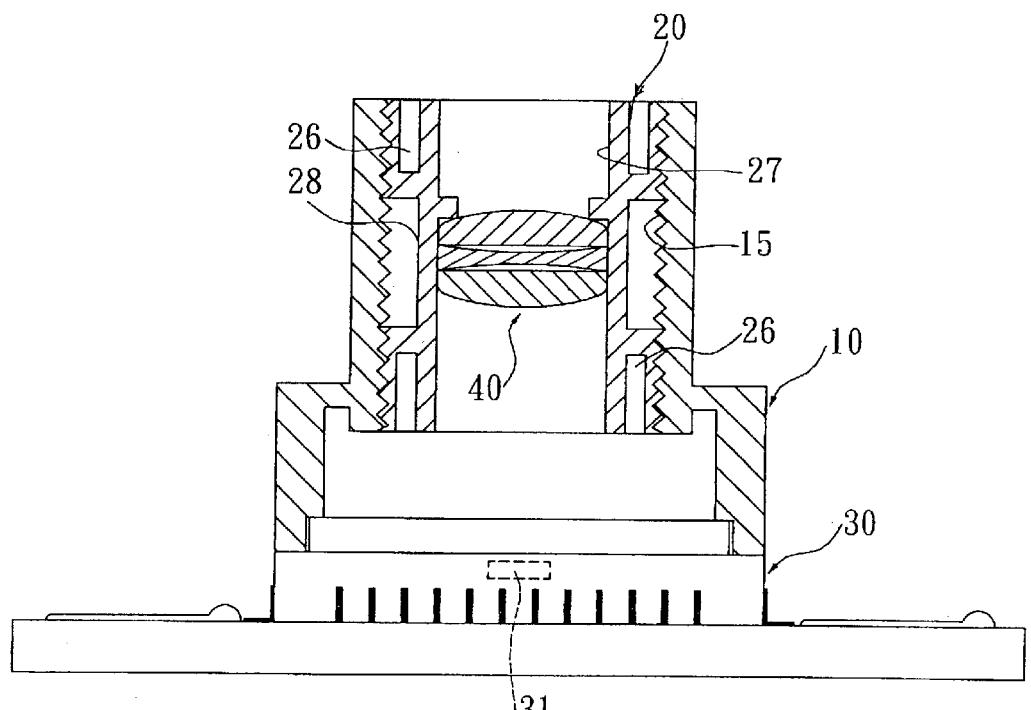
FIG. 6 is a side schematic view in cross-section of a third embodiment of the hood for a digital image-collecting lens in accordance with the present invention.
Figure 7:
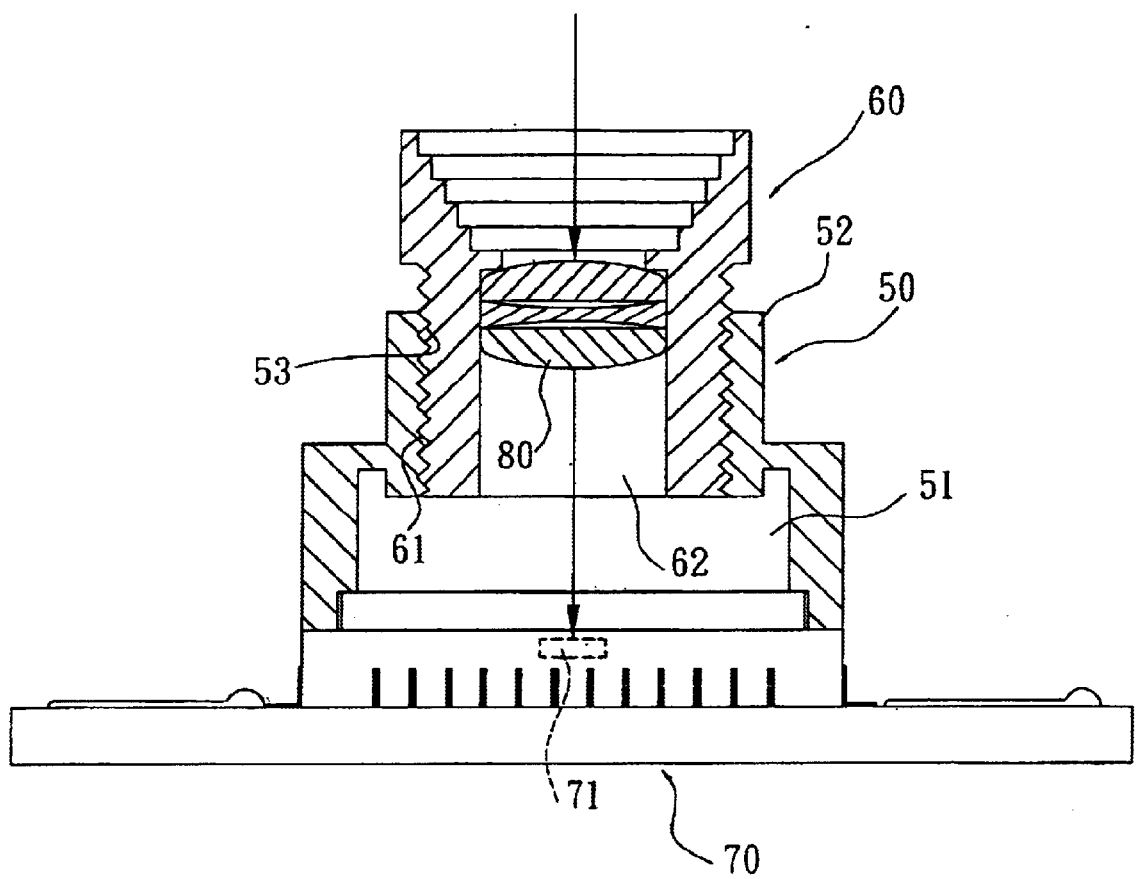
FIG. 7 is a side schematic view in cross-section of a conventional hood for a digital image-collecting lens in accordance with the prior art.
Figure 8:
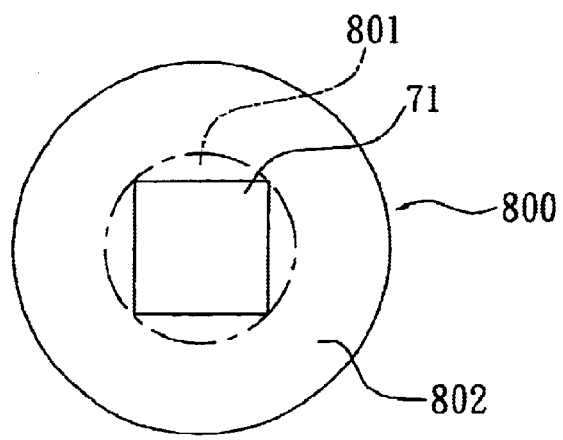
FIG. 8 is a top plan view of a developing zone of the lens that consists the hood in FIG. 7.
Figure 9:
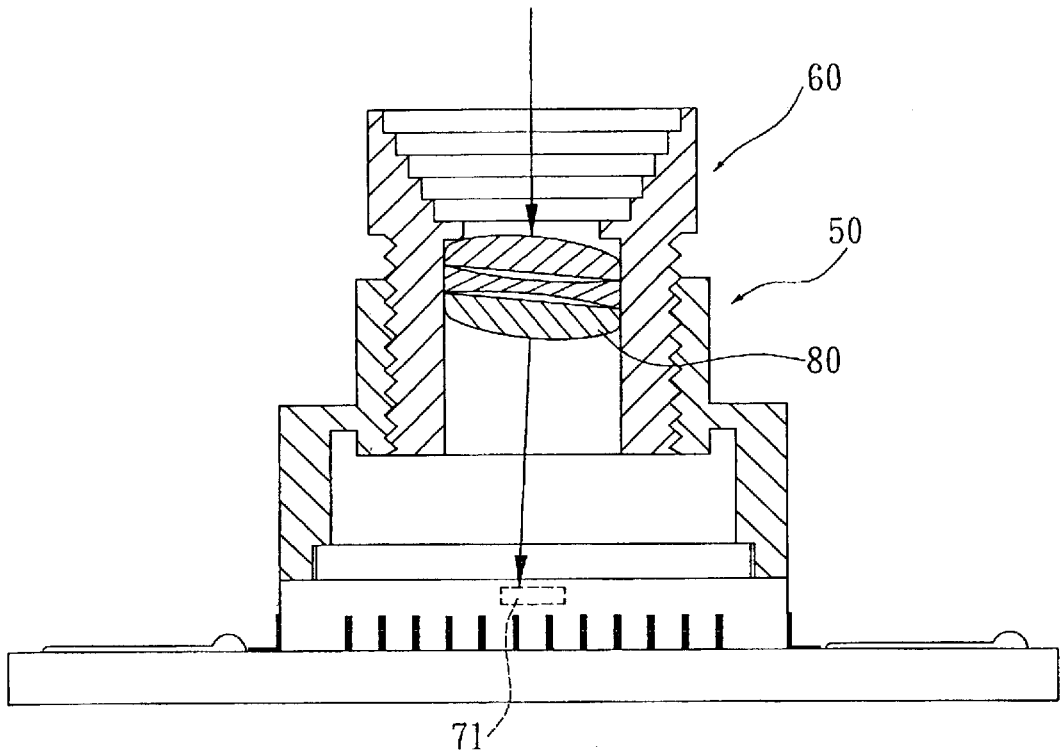
FIG. 9 is a side schematic view in cross-section of a conventional hood for a digital image-collecting lens in which the camera lens is slanted.
Figure 10:
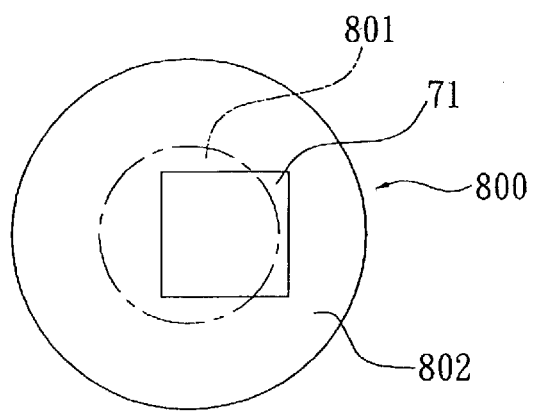
FIG. 10 is a top plan view of a developing zone of the lens in FIG. 9.
Figure 11:
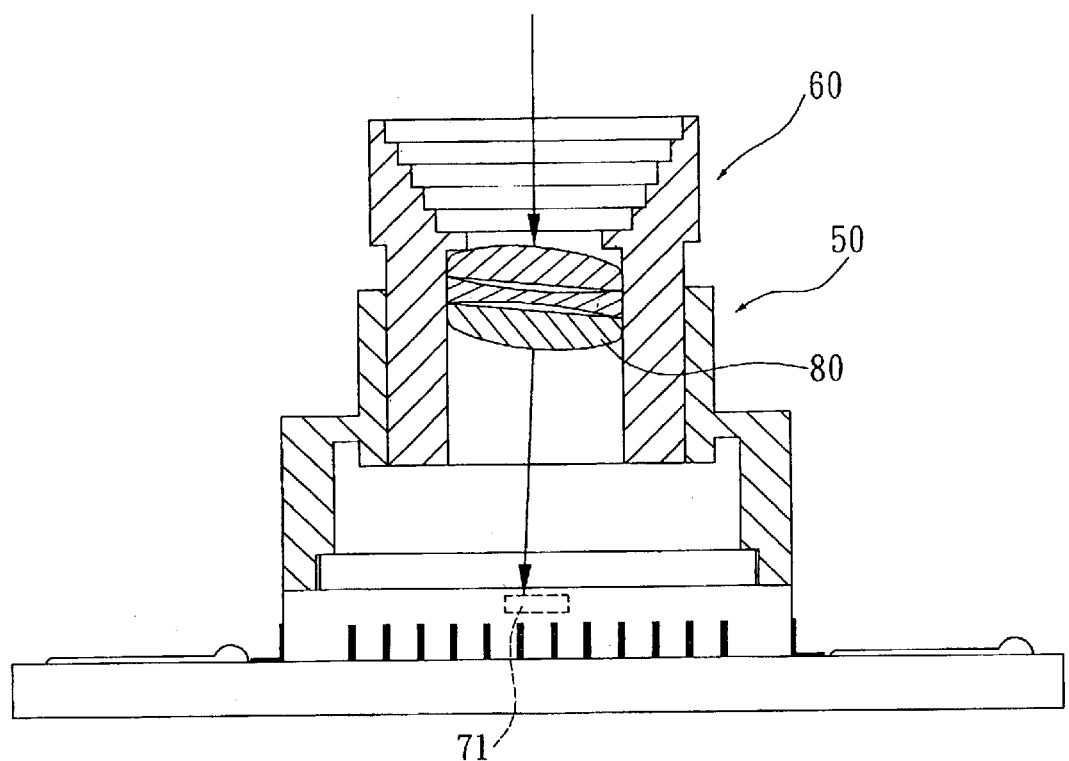
FIG. 11 is a side schematic view in cross-section of another conventional hood for a digital image-collecting lens in accordance with the prior art.

With reference to FIG. 6 that shows a third embodiment of a hood for a digital image-collecting lens in accordance with the present invention. The base member (10) has a threaded hole (15) longitudinally and centrally defined in the protrusion (12). The threaded hole (15) extends to communicate with the recess (11), and straightly and longitudinally corresponding to the coupling crystal (31) of the image sensor (30). The lens seat (20) has a threaded outer periphery such that the lens seat (20) can be screwed into the threaded hole (15) in the base member (10). The lens seat (20) has a through hole (27) longitudinally and centrally defined in the lens seat (20). The through hole (27) in the lens seat (20) is adapted to securely receive the camera lens (40) of the digital image-collecting lens. The lens seat (20) includes two opposite ends each having an annular slot (26) defined between an inner periphery of the through hole (27) in the lens seat (20) and the outer periphery of the lens seat (20). The two annular slots (26) extend toward each other and an annular groove (28) is laterally defined in the outer periphery of the lens seat (20) between the two annular slots (26) in the lens seat (20). The annular groove (28) corresponds to a position where the camera lens (40) is mounted.

The annular slots and the annular groove can prevent the lens seat (20) from being extruded due to the base member (10) after assembling or the material characteristic of expanding when hot. Consequently, the hood of the present invention can ensure the coupling crystal (31) within the preferred area (401) of the developing zone (400) of the lens.

Although the invention has been explained in relation to its preferred embodiment, it is to be understood that many other possible modifications and variations can be made without departing from the spirit and scope of the invention as hereinafter claimed.

What is claimed is:

1. A hood for a digital image-collecting lens, comprising:
   a base member including:
      a recess defined in a bottom of the base member and adapted to receive an image sensor that has a coupling crystal contained in the image sensor; and
      a through hole defined in the base member and communicating with the recess in the bottom of the base member, the through hole adapted to longitudinally and straightly align with the coupling crystal of the image sensor;
      a protrusion extending from a top surface of the base member and the through hole in the base member being defined in the protrusion of the base member; and
   a lens seat longitudinally and secured in the through hole in the base member, the lens seat including:
      a through hole longitudinally and centrally defined in the lens seat, the through hole in the lend seat adapted to received a camera lens of the digital image-collecting lens; and
      at least one annular slot longitudinally defined between an inner periphery of the through hole in the lens seat and an outer periphery of the lens seat, the at least one annular slot longitudinally extending to correspond to the camera lens.

2. The hood a claimed in claim 1, wherein the lens seat includes two opposite ends each having an annular slot defined between the inner periphery of the through hole in the lens seat and the outer periphery of the lens seat, each annular slot extending to correspond to the camera lens to prevent the camera lens form being slanted due to an improper act force.

3. The hood as claimed in claim 1, wherein the lens seat comprises only one annular slot that is defined in a lower end of the lens seat and extends to correspond to the camera lens to prevent the camera lens from being slanted due to an improper act force.

4. The hood as claimed in claim 2, wherein the lens seat comprises an annular groove laterally defined in the outer periphery of the lens seat between the two annular slot in the lend seat, the annular groove corresponding to the camera lens to prevent the camera lens from being slanted due to an improper force.

5. The hood as claimed in claim 3, wherein the through the hole in the base member has a threaded inner periphery and the outer periphery of the lens seat is threaded such that the lens seat can be screwed into the through hole in the base member.

6. The hood as claimed in claim 4, wherein the through hole in the base member has a threaded inner periphery and the outer periphery of the lens seat is threaded such that the lens seat can be screwed into the through hole in the base ember.

\* \* \* \* \*